United States Patent [19]

Clopton

[11] 4,260,305
[45] Apr. 7, 1981

[54] DEVICE FOR PREVENTING TOOL BREAKAGE IN TOOL MACHINES

[76] Inventor: Robert T. Clopton, Rte. 1, Canmer, Ky. 42722

[21] Appl. No.: 26,993

[22] Filed: Apr. 4, 1979

[51] Int. Cl.³ .................. B23D 39/00; B23B 25/06; B23Q 11/04
[52] U.S. Cl. .................. 409/134; 73/141 A; 408/6; 408/8; 408/11; 409/186; 409/187; 409/245; 409/255
[58] Field of Search ......... 408/6, 11, 8; 409/186, 409/254, 187, 255, 245, 246, 193, 234, 194, 195, 148, 149, 155, 147, 134, 287; 73/104, 141 A

[56] References Cited

U.S. PATENT DOCUMENTS

| 1,775,449 | 9/1930 | Chandler | 408/6 |
|---|---|---|---|
| 1,850,299 | 3/1932 | Watson | 408/6 |
| 2,329,541 | 9/1943 | Kuehni | 73/104 X |
| 2,432,633 | 12/1947 | Sirp | 408/48 |
| 2,531,573 | 11/1950 | Konikoff | 408/139 X |
| 2,539,981 | 1/1951 | Welte | 409/254 X |
| 2,775,137 | 12/1956 | Chung | 279/75 |
| 2,814,167 | 11/1957 | Nichols et al. | 408/11 X |
| 2,959,945 | 11/1960 | Hugo et al. | 64/29 |
| 2,978,689 | 4/1961 | Tech et al. | 408/11 |
| 3,471,662 | 10/1969 | Berchtold | 200/61.58 |
| 3,587,361 | 6/1971 | Smith | 408/6 X |
| 3,627,943 | 12/1971 | Blumer | 200/52 |
| 3,723,017 | 3/1973 | Bilz et al. | 408/6 |
| 3,829,230 | 8/1974 | Johnson | 408/14 |
| 3,967,515 | 7/1976 | Nachtigal et al. | 409/141 |
| 4,107,985 | 8/1978 | Sommer | 73/141 A |

FOREIGN PATENT DOCUMENTS

| 344280 | 3/1960 | Switzerland | 408/6 |
|---|---|---|---|
| 1504310 | 3/1978 | United Kingdom | 73/104 |
| 258812 | 6/1968 | U.S.S.R. | 408/8 |
| 584975 | 12/1977 | U.S.S.R. | 408/8 |
| 607706 | 5/1978 | U.S.S.R. | 408/8 |
| 608615 | 5/1978 | U.S.S.R. | 409/187 |

Primary Examiner—William R. Briggs
Attorney, Agent, or Firm—Zalkind & Shuster

[57] ABSTRACT

An accessory for tool machines is provided comprising a tool holder isolatedly carried on bar springs to effect a floating mount. The holder yields in response to selective load stress during cutting and is restricted to a linear force path to relieve stress. The yielding movement relieves stress and can operate signals in the event of overload or operate control means such as switches to cut off tool machine motors.

33 Claims, 10 Drawing Figures

DEVICE FOR PREVENTING TOOL BREAKAGE IN TOOL MACHINES

The present invention relates to a device which can be used as an attachment for various kinds of tool machines, such as drill presses, drilling machines, boring mills, lathes, metal shapers, broaches, and the like, where there is cutting engagement between a work piece member and a tool member with a cutting load pressure which can become excessive to the point of breaking the cutting edges of any particular type of tool. Such pressure would be axial of the tool in the case of drilling, but not in the case of other machines such as a boring mill. A particular feature of the invention resides in providing a resilient mount means which is prestressable so as to yield to a predetermined load depending upon the type of tool being used. Such mount means can be adapted either for holding a tool member or holding a work piece member and is so constructed as to isolate such member from a support housing means attachable to a machine tool. More specifically, a holder is fixedly secured to and carried between a pair of spaced bar springs which are fixedly secured to a housing wherein the bar springs effect the sole support for the holder. By such construction there is a floating support with no frictional resistance to be overcome when excessive pressure causes linear movement of the holder and no skewing effect is experienced when the device is used with radial load tools, such as boring bars or where there may be other misalignment forces which would cause a very heavy frictional drag. The invention provides a prestressing means which produces an initial flexing of the bar springs so that further flexing is responsive to a predetermined load pressure, the prestressing being selectively adjustable for respective tool types. The invention also provides means for manifesting excess load pressure by the use of a rotary transfer shaft having a novel coaction with the holder and carrying a motion amplifying rocker arm for actuating one of a plurality of switches where each switch becomes responsive to a predetermined load in accordance with a selected prestress of the bar springs. The switches may optionally effect various controls, such as signals or motor controls. Modification of the invention for manifesting excess load pressure utilizes a transducer in the form of a linear variable differential transformer, known familiarly in the gage industry as an LVDT.

Cooling fluid through drill passages are conveyed via water inlet means in the housing and holder. Spade drills of the kind used in the prototypes discussed herein are manufactured with such passages leading to the very cutting end and outward against the work.

The advantage of a floating mount and especially with bar springs resides in the practical operation of certain cutting tools where a side thrust can occur, sometimes heavy. Where a tool holder slides in frictional contact with a bore or bearings in the holding means, such side thrust would cause a skewing force of the tool holder on the support means. This would not only cause rapid frictional wear of directly engaged surfaces, but could in a severe case cause possible jamming of tool holder motion.

The floating mount disclosed herein comprising bar springs precludes such occurrences. Not only is there no frictional engagement, but the use of bar springs, especially spaced bar springs, ensures stiff resistance against misalignment of a tool movement path relative the work piece position, resisting any skewing effect of side thrust. Thus, accuracy of tool and work piece engagement in enhanced and precludes chatter.

In the discussion that follows it has been found convenient to speak in terms of the tool holder having a yielding movement under excess contact pressure. Of course, where the invention is used in a machine of a kind where the tool does not move toward the work piece, but the work piece moves toward the tool, it would then be the work holder that would have the yielding movement. Thus, in the embodiments shown herein the tool holder, in essence, a chuck takes conventional round shank tools. Obviously, the holder could take round work pieces of the same diameter, or use sleeve adapters for other diameters, or for work pieces of angular cross section. The tool machine would carry the tool in all such instances. The invention is usable with rotary or reciprocal cutting tool machines, e.g., metal cutting shapers or broaches where excess cutting pressure might break the tool.

In actual experimental use of prototypes on a vertical lathe in a drilling operation, where the lathe could exert a 10,000 lb. axial tool pressure feeding the lathe slide which carried the prototypes, it was found that as drills dulled the axial pressure would naturally increase. If allowed to go to a full 10,000 lb., breakage of the drill could readily occur. Accordingly, by preselecting the axial load pressure for different kinds of drilling tools, e.g., carbide tipped spade drills, tools can be saved. For example, a tool pressure commonly used was preselected at 2,400 lb., causing the invention to function to reverse the lathe slide when dullness reached a point beyond which increasing pressure could cause tool breakage. Preselection of safe pressures for different tools can be ascertained by measuring the bar spring deflection, allowing a maximum of 0.024", known to be a 4,500 lb. force for the bar springs used, which was the maximum thought safely attainable for the prototypes under test. From this deflection and force, preselected pressures to effect a selected deflection can be calculated or measured and matched to the calculated breaking stress of a tool. However, for safety, about half a selected deflection would be used but increased 25% to allow for increasing dullness in use, all found to be within a protective operating range for different tools. The breaking stress of tools is calculated from available sources such as a formula found in handbooks.

The closest prior art known to me is the U.S. patent to Bilz et al, U.S. Pat. No. 3,723,017, issued Mar. 27, 1973, for a drill press chuck having a member which can be pushed back when a certain axial pressure is experienced, against the radial force gripping of clutch balls which are spring biased by a preadjustment means. However, the construction is such that the prestress mechanism cannot eliminate oscillation of the holder which causes chattering during a cutting operation, as compared with the spring bar mount and adjustable prestressing mechanism disclosed herein, which eliminates such chatter. Further, the prior art patent has supporting sliding surfaces, the holder not being isolated and floating as in the present invention, and it is particularly intended for end cutting tools only, not being usable for tools which have radial loads, such as boring bars which the device of the present invention can accommodate. Further, a signal means is used in the prior art patent having radioactive material generally considered dangerous, a feature not present in the instant invention.

Other prior art known to the inventor but of no anticipatory significance is as follows:

| H. P. Chandler | 1,775,449 | Hugo et al | 2,959,945 |
| S. C. Watson | 1,850,299 | R. Berchtold | 3,471,662 |
| E. Sirp | 2,432,633 | T.M. Smith | 3,587,361 |
| S. Konikoff | 2,531,573 | Armin Blumer | 3,627,943 |
| Jackson Chung | 2,775,137 | A.S. Johnson | 3,829,230 |

A detailed description of the invention now follows in conjunction with the drawing, in which.

Certain sectional views are hatched with double lines to show steel material, in accordance with standard enginneering notation.

Figure 1:
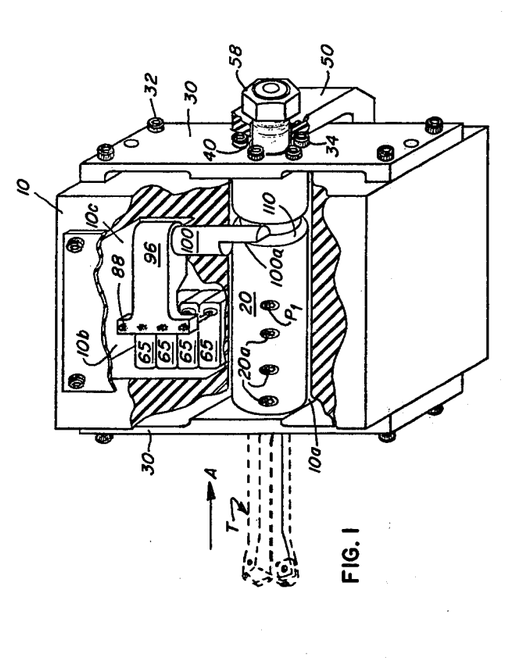
FIG. 1 is a perspective illustration of the invention viewed from the top of a partially broken housing to disclose interior elements, details being omitted for clarity, and assumed to be attached to a tool machine, such as a lathe or horizontal drill.

Referring to the drawing and particularly FIG. 1, the invention comprises a housing 10 of generally rectangular configuration which can be placed on the carriage of a lathe or attached to any tool machine for the purpose of holding a tool such as the tool T as shown in phantom on FIG. 1. For example, in one application of the invention the housing may simply be bolted to a conventional spindle machine that rotates a work piece so that a stationary tool can be advanced to the work piece, such tool being, e.g., a drill, end face mill, or the like. For example, such tools are used on lathes, drilling machines, and the like, vertical or horizontal.

Figure 2:
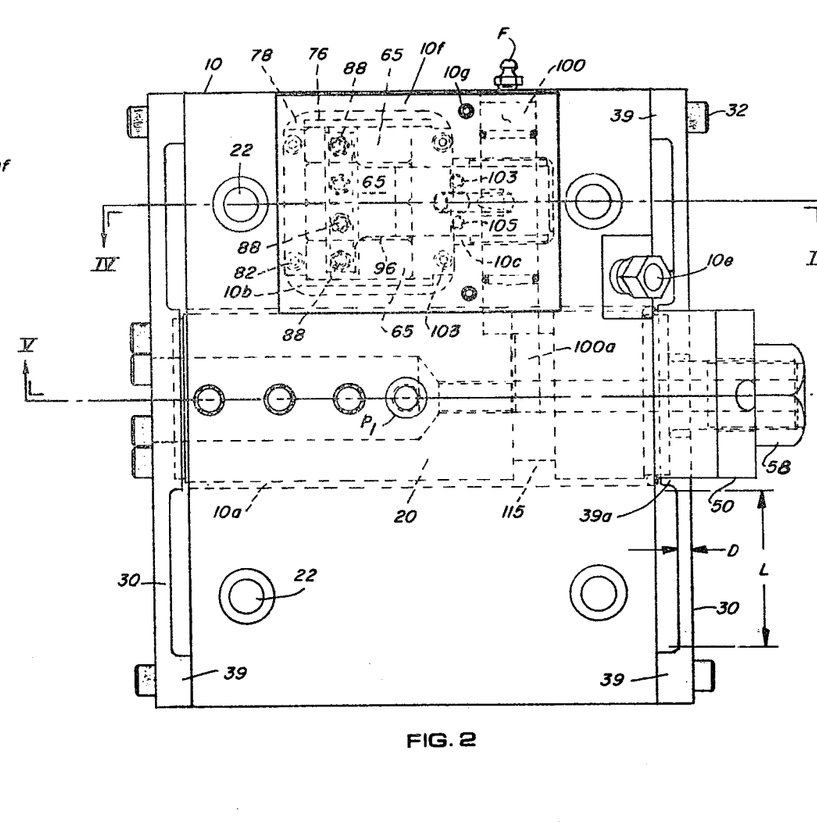
FIG. 2 is a plan view of the invention.

The housing is suitably bored at 10a to accommodate a chuck or tool holder 20 as well as recessed at 10b and 10c of different depth, having a step therebetween, for various coacting components, such as microswitches and actuating elements therefor which are motivated by the tool holder in a manner to be subsequently described, save to say at this time that a slanting bore 10d (FIG. 4) is provided into the housing for wire connections from microswitches in recess 10b through a seal tight conduit connector fitting 10e (FIG. 2). The recesses 10b and 10c are normally closed by cover 10f, secured by screws 10g. The conduit (not shown) for the switch wires (not shown) is flexible so that the device is readily applied to or removed from machine tools.

Figure 5:
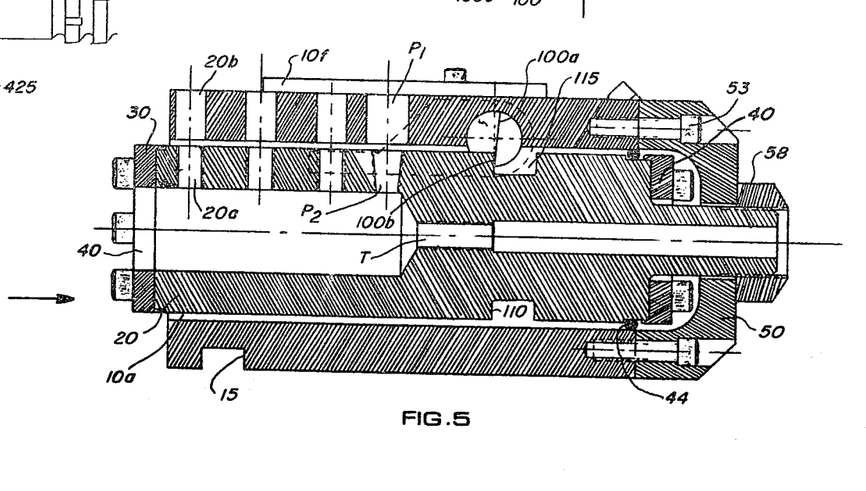
FIG. 5 is a section through V—V of FIG. 2.

As seen in FIG. 5, the invention is provided with a cross slot 15 which can lock onto a cross bar of a lathe carriage or other tool machine carriage to square the accessory to the tool machine so that it can be advanced by the carriage toward the work with the tool being held in a centrally bored chuck or tool holder 20. Thus a tool would be secured as by a series of set screws in bores such as 20a to which access would be had via respective bores, such as 20b, drilled through one wall of the housing.

Figure 4:
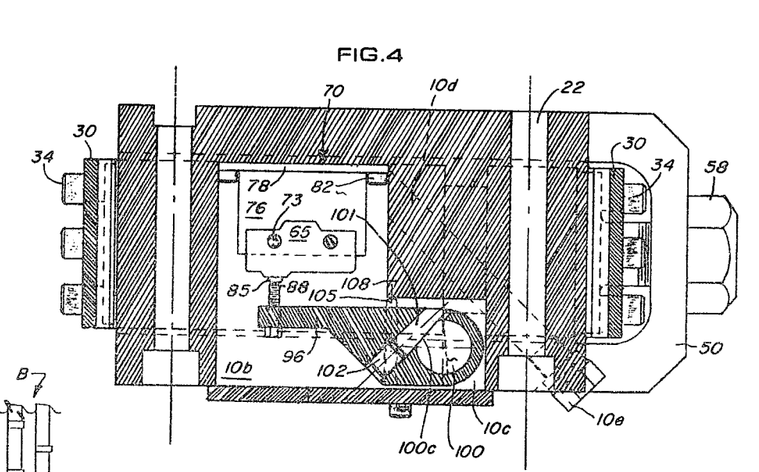
FIG. 4 is a section through IV—IV of FIG. 2.

As viewed in FIGS. 1 and 5, the tool in operation advances toward the left, i.e., toward the work piece (not shown). Suitable means are utilized for bolting the housing to the carriage as by providing the housing with throughbores 22, as seen in FIG. 4.

Figure 3:
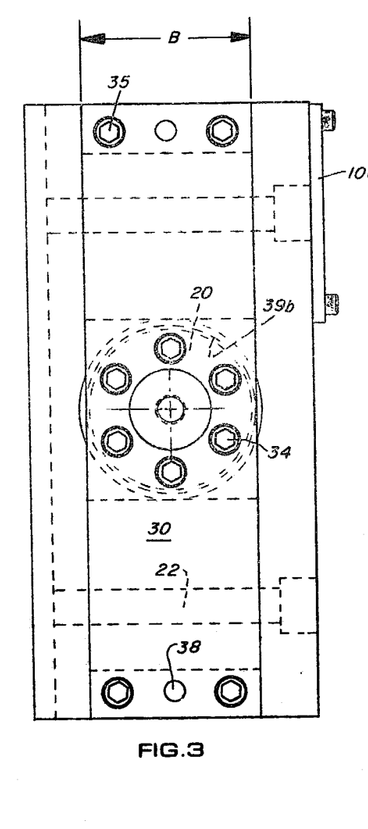
FIG. 3 is an end view taken in the direction of the arrow A of FIG. 1.

The tool holder is completely floating in that it has no frictional engagement within the housing and it is carried at both ends by means of identical bar springs 30, most clearly seen on FIGS. 1 and 2. The bar springs are received on respective ends of the housing by bolts 32 and are fastened to respective ends of the tool holder as by screws 34, arranged in circular array, as shown, and in any suitable plurality, for example, six screws, as shown in FIG. 3.

Locator pins are preferably utilized for exactly positioning the bar springs at the housing ends.

As noted in FIGS. 1 and 2, each bar spring is thickened at its ends 39 to form a spacing for spring flexure relative to the housing and also thickened at the center portion 39a, albeit to a lesser extent, to allow flexing and to insure sufficient depth to take screws 34. Each bar spring is provided with a central aperture 40. Thus, at the outboard end of the housing the tool holder is necked down to pass through an aperture 40 and at the work piece end it will be understood that a tool, when carried in the tool holder 20, will protrude through a bar spring aperture 40. Center portions 39a have a circular recess 39b to exactly center the tool holder 20, FIG. 5.

From the preceding it will be appreciated that the tool holder 20 is fully spring supported, no slide or other bearings being used, and upon a tool receiving axial thrust, for example, in a direction toward the right as viewed on FIGS. 1, 2 and 5, the flexibility of the bar springs will permit axial motion of the tool holder, which has no frictional engagement to impede such motion, albeit one or more suitable sealing O-rings 44 may be utilized to prevent leakage of water coolant and prevent dirt entry.

The bar springs are prestressed in order to make them responsive to axial tool thrust above a certain predetermined degree and also to preclude chatter of the tool in operation. This is accomplished by providing a bridge 50, partially shown in FIG. 1 and fully shown in FIG. 4, which bridge is supported on the outboard end of the housing and secured thereto as by bolts 53, FIG. 5. An adjusting nut 58 is carried threadedly on the end of the tool holder, and it will be apparent that taking up on the nut against the bridge will pull the tool holder toward the right, as seen in FIG. 5, which will cause a flexing or arching of the bar springs at their centers in a direction toward the right and to a degree determined by the amount of takeup provided by adjusting nut 58.

Accordingly, from the description thus far given it will be apparent that a tool carried in the tool holder and being forced against a work piece will effect its drilling, milling or cutting operation with an axial pressure or thrust up to a limit permitted by the prestress in the bar springs, without forcing any relative movement of the tool holder 20. Should a load thrust on the tool become so high that it will push the tool and thus the tool holder toward the right, as viewed on FIGS. 1 and 5, the bar springs being then bowed beyond the prestress setting, a train of events come into play responsive to such motion for the purpose of either stopping the tool machine motor or rendering a signal active to apprise an operator, or both. In any event, some manifestation occurs that the axial tool pressure has exceeded the predetermined thrust limit set. Accordingly, if the machine is stopped or reversed at that point or a signal promptly given whereby the operator will take action, a cutting, drilling, or milling tool can be saved from breakage. Since such tools can cost a couple of hundred dollars and more, the saving is evident.

As noted on FIG. 5, the housing has a port $P_1$ through which a water pipe (not shown) passes for threaded connection with a port $P_2$ in the holder. This carries a coolant water supply under pressure to pass through a drill and emerge at the cutting surfaces.

For fine adjustment of drill positioning a threaded bore T takes a screw (not shown) against which the shank end of the drill can abut.

Having described the mechanical means by which an excessive or over the limit load thrust or pressure can actuate a spring suspended tool holder, the control of signal and/or motor control means responsive to such actuation now follows.

Referring to FIGS. 1, 2 and 4, a bank of several microswitches 65, four being shown, is secured in the housing in recess 10c on a bracket 70, being secured by throughbolts 73 between end flanges 76 on a base 78 secured by bolts 82 to the housing, the flanges and base comprising an integral bracket. Each microswitch has the usual spring biased button 85 to be pressed by the end of a respective adjustable switch actuator screw 88 and any one microswitch 15 is on a live circuit at a particular time, depending on the degree of axial pressure to which the device is to be responsive. Thus, the actuator screws 88 are carried on a rocker arm 96 in recess 10b aligned so as to engage respective switch buttons 85 but individually adjusted for predetermined tool loads to move respective distances to actuate a respective microswitch depending on the tool load for a tool type to which the device is to be responsive. As seen in FIG. 5, the rocker arm is keyed to rotary transfer shaft 100 carried by the housing, the shaft having a flat area 100a with an edge 100b which edge engages the tool holder 20 to transfer the axial movement of the tool holder from linear to pivotal motion of the rotary shaft in the event of axial thrust motion effecting flexing of springs 30.

The shaft 100 and rocker arm 96 are securely keyed by a taper pin 101, FIG. 4, engaging a flat 100c on the shaft and forced thereagainst by a set screw 102, the pin and set screw being carried in the rocker arm. The initial adjustment setting of the rocker arm relative the switches, and rotary transfer shaft setting, is effected by adjusting set screws 103, FIG. 2, of a pair of spring pressed plungers 105, FIG. 4, carried by the rocker arm, abutting a housing portion 108 to present the rotary shaft edge 100b to the tool holder surface 110, FIG. 5, for line contact so as to be driven thereby.

Thus, as particularly seen in FIG. 5, the flat 100a is at an angle so that its edge 100b engages a land 110 of a groove 115 in the tool holder 20. Upon relative shift of the tool holder in the direction of the arrow, FIG. 5, the shaft 100 will be rotated in the counterclockwise direction carrying the rocker arm 96 with it and effecting microswitch actuation by means of screws 88 engaging buttons 85, FIG. 4.

An Alemite fitting F (FIG. 2) is provided for lubricant for shaft 100 which has suitable O-ring seals as shown.

Comparing FIG. 5 with FIG. 4, the swing of the rocker arm 96 is proportional to the distance from edge 100b which is the line of contact with land 110, to the axis of rotation of transfer shaft 100. This pivotal motion is greatly amplified by the distance from the axis of the shaft 100 to the point of contact of an actuating screw 88 with a respective microswitch button 85. Accordingly, the invention can be made very sensitive to a very small linear movement of the holder 20, the rocker arm being in effect a motion amplifying lever, with a motion amplifying increase in the ratio of the described distances as will be apparent.

Further, the sensitivity of response can be adjusted to very fine values by individual adjustment of the screws 88, since obviously screws 88 can be set in stepped array to provide very small lost motion for operating respective switches.

Referring to FIGS. 2 and 3, I have found, based on experimental prototypes, that a spring deflection of 0.024 inches for a 4,500 lb. load pressure is operable using springs of some nine inches between end screw holes, with a three inch width (B, FIG. 3) one 0.250 inch thick (D, FIG. 2) in the flexing portions which are 2.75 inches long (L, FIG. 2) on each side of the central half inch thickened area. The thickness of the ends (not central area) is five-eights inch. The material used was A.I.S.I. 6150, heat treated Rockwell C scale hardness 40-45, triple draw heated A.I.S.I. signifies American Institute of Steel and Iron.

Spring design is along conventional lines wherein deflection at the central area, $$X = (WL^3/12EI) \times 2$$

Where:

$$I = (B^2 + D^2)/12$$

(B = width of spring)
(D = thickness of flexing portions)
And:
E = Modulus of elasticity of material
W = load
L = length of each flexing portion Calibration of the springs is of particular importance, and it should be noted that the length L of each flexing area was calculated for the experimental prototypes as the distance between center lines of the radii of the fillets or transitions where the thinned flexing areas such as B×L join the thickened nonflexing portions 39, 39a, i.e., the planar areas only are flexed.

It will be appreciated that normally open or normally closed switches may be used, due regard being had for the conventional control circuitry usable with either type. Such circuitry and connecting wires through bore 27, etc. are omitted herein since it is not necessary to the disclosure of the invention. All such subject matter is well known and can be devised or selected by any person skilled in the art to achieve any one or several functions all responsive to movement of holder 20 beyond the prestress setting of bar springs 30. Such functions can be sound or flashing light signals, stopping or reversing tool machine motors, warning signals at a remote station, a sequence of reversing and then stopping, etc.

Figure 6:
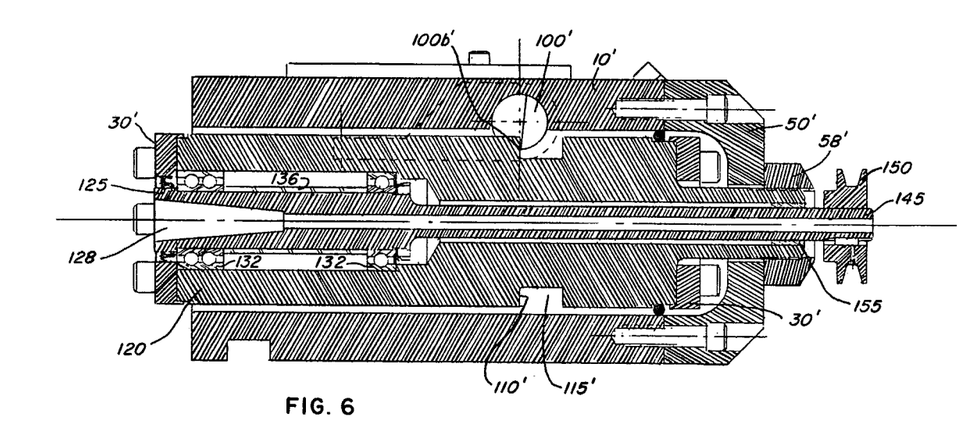
FIG. 6 is a longitudinal section of a modification using a rotary tool in the holder.

FIG. 6 shows a longitudinal cross section of a modification wherein the holder means secures a rotary tool, it being understood that the work is fastened in a chuck or vise of a machine tool.

Thus, in FIG. 6, where like reference characters are primed and refer to similar parts of FIGS. 1–5, housing 10' contains holder 20' and carries the rotary transfer shaft 100' having flat 100a' with edge 100b' engaging the land 110' of a groove 115' in holder 20' wherein a rotary tool (not shown) is to be held in a rotary spindle 125 concentric in the spindle. Securing of the tool is in a conventional manner as by taper socket 128. The spindle 125 is carried in ball bearings such as 132 at the ends of a spacer sleeve 136 encompassing the spindle, the bearing and sleeve assembly being secured by a nut 140 threaded on to the spindle as shown. The spindle extends through the holder which is carried by springs 30' in the manner heretofore described and being secured to the housing wherein a bridge 50' on the housing engaged by adjusting nut 58' all functions in the manner described as in FIGS. 1–5 for prestressing the bar springs 30'.

An elongated shank 145 of the spindle extends through the outboard end of the holder and through the nut 58' and is keyed to a pulley 150 for effecting rotational drive of the spindle by any suitable means, e.g., a belt drive. A plastic bushing 155 centers the spindle within the holder and has a smooth, rotative fit on the spindle shank so that a predetermined axial thrust on a tool can move the assembly of holder and spindle to the right against the prestress of the springs for signal and/or motor control functions. Since such movement is a very small fraction of an inch, belt deflection on the pulley would not be significant.

Figure 7:
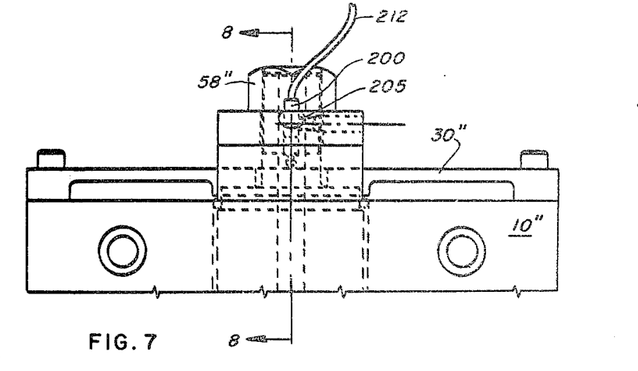
FIG. 7 is a plan view of a modification using a transducer responsive to the yielding of the resilient mount of the device.
Figure 8:
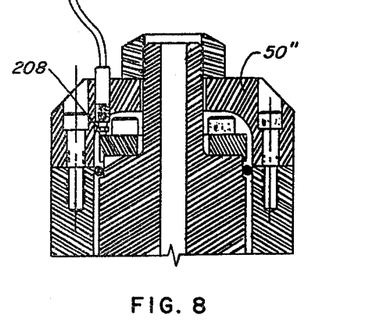
FIG. 8 is a section through 8—8 of FIG. 7.
Figure 9:
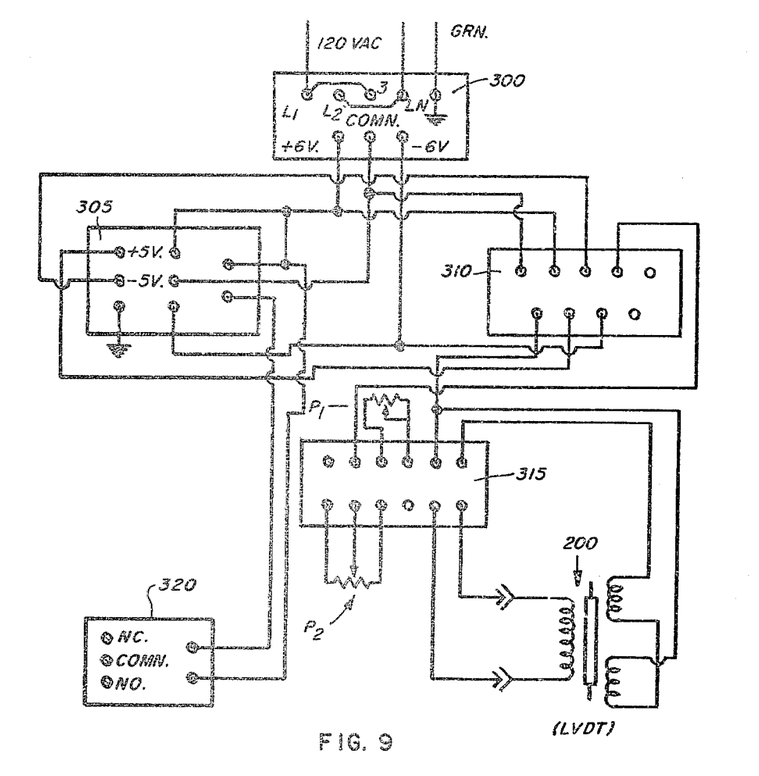
FIG. 9 is an electrical diagram of a form of circuitry controlled by the transducer shown in FIGS. 7 and 8.

In the modification of FIGS. 7–9 a simplified arrangement is disclosed which uses a transducer to eliminate the mechanical switch actuation components used in FIGS. 1–6, such as the rotary transfer shaft, rocker arm, microswitches and attendant components.

Thus as seen in FIGS. 7 and 8, a linear variable differential transformer 200 is secured in a bore in bridge 50" by a set screw 205 and has a probe 208 engaging the outboard bar spring 30".

Such a transducer is used industrially as a gage head and has been known for years in the trade as an LVDT. It operates electrically, the connecting wires 212 extending out of the LVDT for circuit control. Thus, upon the bar springs yielding to excess load the probe 208 is actuated to control appropriate circuitry for manifesting signal and/or motor control.

Any suitable circuitry may be used, well within the skill of persons in the art, one such circuit being shown in FIG. 9 wherein the wiring between electrical components for response to movement of LVDT 200 is shown.

For specificity the reference numerals pertain as follows:
200—LVDT - Schaevitz PCA 112 020.
300—±VDC power supply - Simpson Model 30202
305—Set Point Module—Simpson 2 Digit, Cat. 30204
310—Meter (calibrated to read lbs. thrust 0–5000 scale. - Simpson Model 7527B Cat. 30154
315—Line Power Module Schaevitz—LPM 210
320—6VDC, 150 ohm relay AMF Potter & Blumfield, Cat. R10. - E3167.1 Model 7708 (DPDT)
$P_1$—Potentiometer 100 ohms
$P_2$—Potentiometer 10 ohms The set point module 305 is used to preset the thrust limit of the LVDT by utilizing analog voltage and reference voltage outputs as inputs to the LVDT control module 315 which is a signal conditioner for the LVDT.

The module 315 converts AC line current to DC for the LVDT 200 where it is varied in accordance with a calibration chosen for a particular tool load pressure, by nut 50". Upon such load being exceeded, movement of the LVDT probe 208 transmits a signal to module 315 to be transmitted to meter 310. The 10K potentiometer adjusts the zero point on the meter 310 and the 100K potentiometer controls the meter gain to correlate the travel of the LVDT to the meter range. The relay 320 is operated by 6 volts DC to control 120 volt AC through NO and NC common contact terminals for operation of motor starter relays, solenoid valves, warning signals such as lights or buzzers, etc., as the output of the circuitry which receives voltages from the set point module to effect manifestations of excess load thrust, such as by stopping and/or reversing motors, sounding alarms and the like.

The circuitry and components, as heretofore mentioned, is a matter of routine and no claim made therefore.

Figure 10:
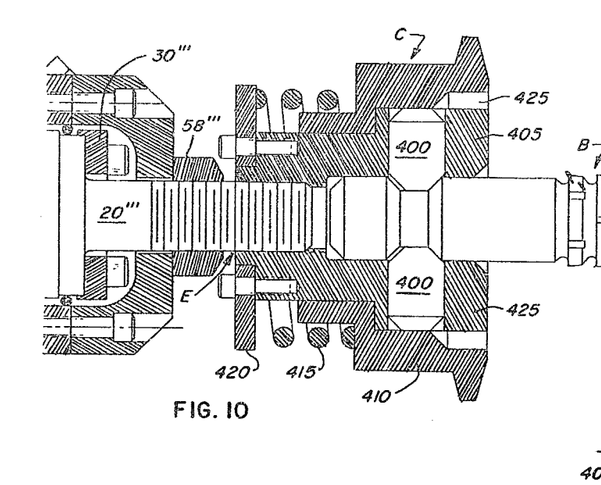
FIG. 10 is a longitudinal section illustrating a mode of utilizing the invention for protecting the cutting teeth of a broach.

FIG. 10 illustrates a modification of the same construction as in FIGS. 1–5 except arranged for a tensile tool load such as for a broach B secured by a conventional broach coupling C to the threaded extension E of holder 20'''. The extension is exterior of housing 10''' and also carries the prestressing adjustment nut 58''' acting against bridge 50''' to prestress springs such as spring 30'''.

The coupling can be any conventional construction, the one shown comprising essentially lock pins 400 which enage the notched broach B. The pins are carried in a housing 405 threaded on the holder extension, as shown. A spring pressed release ring 410, biased by spring 415, retained by a keeper 420 can be pressed to align the pins with notches 425 in the release ring. The broach is simply thrust between the lock pins for connection and released by pressing downward on the release ring so that the lock pins can move outwardly into notches 425 of the release ring.

It should be noted that the prestressing of the bar springs is in the same stressing direction whether the tool load is compressive or tensile. In the case of use with a broach the housing 10''' would be attached to a pull bar and the tensile load on the broach is in the same prestressing direction.

The sensing of excess load and manifestation can be either by microswitches as in FIGS. 1–5 or by electronic transducer (LVDT) as in FIGS. 6–9.

Further, a machine attaching means as in FIGS. 1–5 can be used for attachment of the housing to a pull bar, or any obvious variation of such attaching means. Still further, the same accessory can be used for compressive loads by using a tool or work piece holding socket in the holder as in FIGS. 1–5. Various modes of attachment for such a universal accessory may be readily devised for use with compressive and tensile load tool machines and different machine constructions, all well within the skill of the persons working in the art.

In conclusion, it will be apparent that the device of the invention can be used to detect excess load pressure of a large variety of tool machines whether of a rotating type such as a drill or boring mill or a reciprocating type, such as a metal shaper or broach. Thus, the application of force to the yielding means need only be in the direction of yielding of such means and the yielding effect manifests itself even though the direction of force against the yielding means is not axial therewith, as it would be in a drill press, but parallel thereto, as it would be in a boring mill, broach or shaper. The construction inherently includes one member of the device carried by the bar springs so that it must always move linearly regardless of whatever radial or side thrust may be experienced and without introducing skewing or misalignment effects which could produce considerable friction in prior art constructions where the movable element is supported directly by the walls of a housing.

Accordingly, I do not seek to be limited to the precise illustrations herein given except as set forth in the appended claims.

What is claimed is:

1. A device for protecting tools against excessive cutting pressure and being of the kind which has a support means for a holder means carried by a yieldable means prestressable to yield to a selected cutting pressure for operating a control means;

the improvement wherein said yieldable means is a resilient mount means and wherein said holder means comprises a holder isolatedly and movably carried by said resilient mount means; and being restricted to linear movement thereby;

said resilient mount means being secured to said support means and to said holder wherein said resilient mount means is the sole support for said holder;

selective prestressing means intermediate said support means and said holder for prestressing said resilient mount means;

said resilient mount means being thereby selectively prestressable for yielding movement of said holder relative to said support means when cutting pressure exceeds a selected prestress in said resilient mount means for operating a control means.

2. A device as set forth in claim 1, wherein said mount means comprises bar spring means carried by said support means and said holder being carried by said bar spring means.

3. A device as set forth in claim 2, wherein said bar spring means comprises a pair of bar springs spaced on said holder and secured adjacent respective ends thereof.

4. A device as set forth in claim 3, wherein said selectively prestressing means comprises a member adjustable relative to said holder and stressable against said support means to flex said bar spring means to a predetermined extent to yield to a selected load pressure.

5. A device as set forth in claim 3, wherein said means operable in response to said yielding movement comprises a rotary shaft engaging said holder and rotative in response to linear movement thereof.

6. A device as set forth in claim 5, wherein said holder is provided with a radially flattened area and said rotary shaft is provided with an edge in engagement therewith for effecting rotation of said shaft upon linear movement of said holder.

7. A device as set forth in claim 6, including a rocker arm carried by said rotary shaft and rotative therewith and elongated to amplify the rotary shaft movement, and switch means operated by rotation of said rocker arm.

8. A device as set forth in claim 6, including adjustable spring plunger means carried by the said rocker arm and abuttable with a portion of said support housing means for setting the angle of said rotary shaft with respect to said holder for effecting engagement of the edge of said rotary shaft therewith.

9. A device as set forth in claim 7, said switch means comprising a plurality of switches and said rocker arm having adjustable screws for operating respective switches to predetermine the extent of movement of said rocker arm for actuating respective switches.

10. A device as set forth in claim 8, including means for fixedly securing said rocker arm to said rotary shaft comprising a taper bore in said rocker arm and a flat on said rotary shaft adjacent said bore; a taper pin slidable in said bore and a set screw in said rocker arm engageable with said taper pin for forcing said taper pin into tight contact against said flat of said rotary shaft to positively key said rotary shaft and said rocker arm.

11. A device as set forth in claim 1, including a rotary spindle within said holder and carried thereby and being rotative relative thereto, wherein said holder is the sole support for said rotary spindle.

12. A device as set forth in claim 1, wherein said means operable in response to said yielding movement comprises a rotary shaft engaging said holder and rotative in response to linear movement thereof.

13. A device as set forth in claim 12, wherein said holder is provided with a radially flattened area and said rotary shaft is provided with an edge in engagement therewith for effecting rotation of said shaft upon linear movement of said holder.

14. A device as set forth in claim 13, including a rocker arm carried by said rotary shaft and rotative therewith and elongated to amplify the rotary shaft movement, and switch means operated by rotation of said rocker arm.

15. A device as set forth in claim 1, wherein resilient mount means comprises a pair of bar springs fixedly secured on the ends of said holder and each said bar spring being apertured for access to the ends of said holder.

16. A device as set forth in claim 15, wherein said support means comprises a housing having a throughbore in which said holder extends and a bar spring across said throughbore at each end thereof and having ends fixedly secured to said housing with an end of said holder secured to a bar spring at a respective end of said throughbore.

17. A device as set forth in claim 16, including a bridge member secured to said housing at an end thereof and straddling one said bar spring and having a portion spaced therefrom; said holder having a portion extending through said one bar spring and adjusting means for drawing said holder portion toward said bridge member to prestress both said bar springs.

18. A device as set forth in claim 17, wherein said last mentioned bar spring is of generally rectangular configuration having a thickened central area fastened to the respective end of said holder and having thickened end areas fastened to said housing and having flexing areas extending on each side of said central thickened area to a respective thickened end area.

19. In a device as set forth in claim 17, wherein said bar springs are identical and disposed in parallel planes.

20. A device as set forth in claim 1, wherein said means operable in response to said yielding movement comprises a rotary shaft engaging said holder and rotative in response to linear movement thereof, and wherein said holder is provided with a radially flattened area and said rotary shaft is provided with an edge in engagement therewith for effecting rotation of said shaft upon linear movement of said holder, including a rocker arm carried by said rotary shaft and rotative therewith and elongated to amplify the rotary shaft movement, and switch means operated by rotation of said rocker arm, said housing support means including a housing in which said holder is reciprocal; said rotary shaft having a flat section effecting said edge and means intermediate said housing and rocker arm for adjusting the angle between said flat section of said rotary shaft and said flattened area of said holder to present said edge thereto and to space said rocker arm from said switch means.

21. A device as set forth in claim 1, including means operable in response to yielding movement comprising an electrical transducer carried by said support means and actuatable by said resilient mount means upon yielding movement thereof wherein said electrical transducer comprises a linear variable differential transformer having a movable element; said resilient mount means comprising bar spring means having a bar spring engaging said movable element for actuating said transducer upon said yielding movement.

22. A device as set forth in claim 21, and a member carried by said support means and spaced from said bar spring and carrying said transducer.

23. A device as set forth in claim 22, including an adjustable connection between said holder and said member for prestressing said bar spring.

24. An accessory for a tool machine to prevent tool breakage wherein the tool machine is of the kind that provides relative motion between a cutting tool member and a work piece member with cutting contact pressure therebetween during the course of a cutting operation and wherein the accessory comprises a support means to be connected to a tool machine and carries a holder means to be secured to one member while the other member is provided with motion relative said other member by said tool machine;
the improvement wherein:
said holder means comprises a holder for said one member and further comprises a resilient mount means directly secured to said holder as the sole support for said holder; said resilient mount means being secured to said support means;
prestressing means intermediate said support means and said resilient mount means for effecting a selected prestressed condition of said resilient mount means corresponding to a selected contact pressure whereby to permit a yielding movement of said holder in a direction to relieve contact pressure exceeding said selected prestressed condition in said resilient mount means;
wherein said resilient mount means comprises bar spring means disposed to yield on excess cutting pressure and being fixedly secured to said support means and to said holder; said holder being carried solely and directly by said bar spring means and wherein said bar spring means effects plural supports for said holder to maintain linear movement of said holder.

25. An accessory as set forth in claim 24, wherein said bar spring means comprises a pair of bar springs spaced on said holder.

26. An accessory as set forth in claim 25, wherein said prestressing means comprises means secured to and adjustable on said holder and effecting stress against said support means to flex a bar springs to said selected prestressed condition corresponding to a selected contact pressure.

27. An accessory for a tool machine to prevent tool breakage wherein the tool machine is of the kind that provides relative motion between a cutting tool member and work piece member with cutting contact pressure therebetween during the course of a cutting operation and wherein the accessory comprises a support means to be connected to a tool machine and carries a holder means to be secured to one member while the other member is provided with relative motion by said tool machine;
the improvement wherein:
said holder means comprises a holder for said one member and further comprises a resilient mount means for said holder as the sole support for said holder on said support means;
said resilient mount means being secured to said support means;
selective prestressing means intermediate said support means and said holder; said holder having tensile connection means for tensile force connection to a broach;
means whereby said support means may be connected to a power driven slide of a tool machine; whereby excess tensile load effected by a broach connected to said holder effects said yielding movement.

28. An accessory as set forth in claim 27, said yielding movement being operative to effect manifestation thereof.

29. An accessory as set forth in claim 27, wherein said tensile connection means comprises a threaded extension on said holder and said prestressing means comprising a nut thereon and comprising means on said housing for effecting support for said nut upon being adjusted to exert a tensile prestressing force on said holder to prestress said resilient mount means; said tensile connection means for said broach comprising a broach coupling having a nut member adjustably positionable on said threaded extension.

30. An accessory as set forth in claim 29, including means operable in response to said yielding movement to effect manifestation thereof.

31. An accessory for a machine tool to prevent tool breakage comprising a support means and a tool holder mountable therein secured to said support means in a floating mount comprised of at least two spaced springs intermediate said holder and said support means;
said springs having flat sides in planes normal to movement of said holder when said holder is subjected to an axial cutting force effecting flexing of said springs whereby said springs maintain linear movement of said holder;
means for prestressing said springs comprising bridge means extending across an end of said holder and spaced therefrom;
adjusting means interposed between said holder and said bridge means operable to effect an initial prestressed condition of said springs whereby movement of said holder in response to cutting pressure occurs when said pressure is in excess of the prestressed condition of said springs;
wherein said movement is operative to relieve such excess pressure and operative to control a manifestation of such excess pressure.

32. An accessory as set forth in claim 31, each said spring being a bar of rectangular section having length, width and edges wherein said flat sides are the width thereof;

said holder being secured centrally of said springs and said springs having ends secured to said support means.

33. An accessory as set forth in claim 32, said bridge means comprising a member extending transversely across the direction of movement of said holder;

said adjusting means comprising threaded members interposed between said bridge means and said holder.

* * * * *